US012560764B2

(12) United States Patent
Roslund et al.

(10) Patent No.: US 12,560,764 B2
(45) Date of Patent: Feb. 24, 2026

(54) LASER SYSTEMS FOR SPECTROSCOPY

(71) Applicant: Vector Atomic, Inc., Pleasanton, CA (US)

(72) Inventors: Jonathan David Roslund, Pleasanton, CA (US); Martin Machai Boyd, Pleasanton, CA (US); Arman Cingoz, Pleasanton, CA (US)

(73) Assignee: Vector Atomic, Inc., Pleasanton, CA (US)

( * ) Notice: Subject to any disclaimer, the term of this patent is extended or adjusted under 35 U.S.C. 154(b) by 473 days.

(21) Appl. No.: 18/054,428

(22) Filed: Nov. 10, 2022

(65) Prior Publication Data

US 2024/0159971 A1    May 16, 2024

(51) Int. Cl.
| | |
|---|---|
| *G02B 6/293* | (2006.01) |
| *G01J 3/433* | (2006.01) |
| *G02B 6/35* | (2006.01) |

(52) U.S. Cl.
CPC .......... *G02B 6/29395* (2013.01); *G01J 3/433* (2013.01); *G02B 6/354* (2013.01); *G02B 6/3594* (2013.01)

(58) Field of Classification Search
CPC .. G02B 6/29395; G02B 6/354; G02B 6/3594; G01J 3/433
See application file for complete search history.

(56) References Cited

U.S. PATENT DOCUMENTS

| | | | | |
|---|---|---|---|---|
| 4,193,690 | A * | 3/1980 | Levenson | G04F 5/14 |
| | | | | 356/301 |
| 4,590,597 | A | 5/1986 | Long-sheng et al. | |
| 4,918,699 | A * | 4/1990 | Boyd | H01S 3/305 |
| | | | | 359/241 |
| 6,175,416 | B1 * | 1/2001 | Maris | G01N 21/1702 |
| | | | | 356/432 |
| 9,869,731 | B1 * | 1/2018 | Hovde | G01R 33/26 |
| 10,340,658 | B1 * | 7/2019 | Boyd | H05H 3/02 |
| 10,684,591 | B1 * | 6/2020 | Burke | H01S 3/1303 |
| 11,940,374 | B2 * | 3/2024 | Nelson | G02F 1/3551 |
| 2021/0088657 | A1 * | 3/2021 | Shah | G01S 17/42 |
| 2022/0155730 | A1 * | 5/2022 | Ye | H01S 3/1307 |
| 2023/0039230 | A1 * | 2/2023 | Lawrie | G01N 21/21 |

OTHER PUBLICATIONS

Development of a compact optical absolute frequency reference for space with 10â15 instability by Schuldt et al. ; full text. annotated (Year: 2017).*

(Continued)

*Primary Examiner* — Tarifur R Chowdhury
*Assistant Examiner* — Kaitlyn E Kidwell
(74) *Attorney, Agent, or Firm* — Patterson + Sheridan, LLP

(57) ABSTRACT

Embodiments herein describe spectroscopy systems that provide frequency, amplitude, and power-stabilized light to a vapor cell. An optical signal can be split into two optical paths where a first optical path includes an AOM to perform frequency and amplitude modulation to generate a pump optical signal and a second optical path that includes a variable optical attenuator (VOA) for generating a probe optical signal. These optical signals can then be provided into a vapor cell (also referred to as a gas cell) to perform spectroscopy.

19 Claims, 9 Drawing Sheets

(56)                    References Cited

OTHER PUBLICATIONS

European Patent Office, Extended European Search Report for European Patent Application No. 23201785.5, dated Mar. 25, 2024.

Eickhoff M L et al: "Optical Frequency Inv. Standard at 532 NM", IEEE Transactions on Instrumentation and Measurement, IEEE, USA, vol. 44, No. 2, Apr. 1, 1995 (Apr. 1, 1995), pp. 155-158, XP000539664.

Wu Yue et al: "Semiconductor laser active frequency stabilization technologies: a review", Journal of the Korean Physical Society, the Korean Physical Society, Seoul, vol. 79, No. 9, Oct. 15, 2021 (Oct. 15, 2021), pp. 795-809, XP037616915.

Mal S et al: "Doppler-Free Two-Photon Modulation Transfer Spectroscopy in Sodium Dimers", Applied Physics B . Photophysics and Chemistry, Springer Verlag . Heidelberg, DE, vol. 351, No. 3, Sep. 1, 1990 (Sep. 1, 1990), pp. 233-237, XP000149690.

Bai Yang et al: "Improve the Frequency Stabilization of CS Fountain Clock's Optical System with Modulation Transfer Spectroscopy", 2019 Joint Conference of the IEEE International Frequency Control Symposium and European Frequency and Time Forum (EFTF/IFC) , IEEE, Apr. 14, 2019 (Apr. 14, 2019), pp. 1-3, XP033623046.

Döringshoff, K., Schuldt, T., Kovalchuk, E. V., Stühler, J., Braxmaier, C., & Peters, A. (2017). A flight-like absolute optical frequency reference based on Iodine for laser systems at 1064 nm. Applied Physics B, 123(6), 1-8. [Abstract Only].

Schuldt, T., Döringshoff, K., Kovalchuk, E. V., Keetman, A., Pahl, J., Peters, A., & Braxmaier, C. (2017). Development of a compact optical absolute frequency reference for space with 10? 15 instability. Applied optics, 56(4), 1101-1106. [Abstract Only].

Döringshoff, K., Gutsch, F. B., Schkolnik, V., Kürbis, C., Oswald, M., Pröbster, B., . . . & Peters, A. (2019). Iodine frequency reference on a sounding rocket. Physical Review Applied, 11(5), 054068. [Abstract Only].

Schuldt, T., Gohlke, M., Oswald, M., Wüst, J., Blomberg, T., Döringshoff, K., . . . & Braxmaier, C. (2021). Optical clock technologies for global navigation satellite systems. GPS Solutions, 25(3), 1-11.

\* cited by examiner

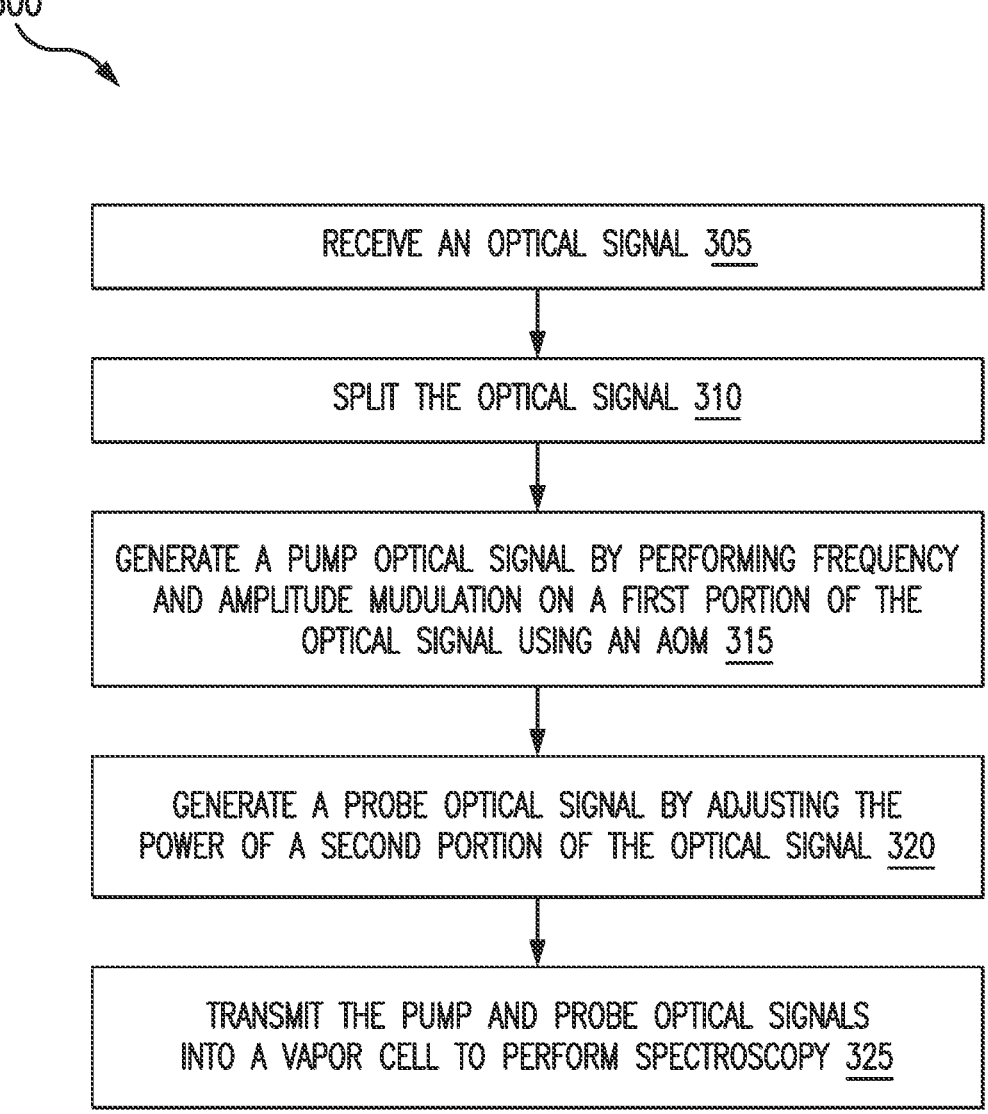

300

RECEIVE AN OPTICAL SIGNAL 305

SPLIT THE OPTICAL SIGNAL 310

GENERATE A PUMP OPTICAL SIGNAL BY PERFORMING FREQUENCY AND AMPLITUDE MUDULATION ON A FIRST PORTION OF THE OPTICAL SIGNAL USING AN AOM 315

GENERATE A PROBE OPTICAL SIGNAL BY ADJUSTING THE POWER OF A SECOND PORTION OF THE OPTICAL SIGNAL 320

TRANSMIT THE PUMP AND PROBE OPTICAL SIGNALS INTO A VAPOR CELL TO PERFORM SPECTROSCOPY 325

FIG. 3

LASER SYSTEMS FOR SPECTROSCOPY

STATEMENT OF GOVERNMENT INTEREST

This invention was made with government support under contract N6833520C0116 awarded by the United States Naval Air Warfare Center. The government has certain rights in the invention.

BACKGROUND

Field

Embodiments of the present invention generally relate to a laser system to perform spectroscopy.

Description of the Related Art

Optical atomic clocks offer improved frequency instabilities compared to microwave frequency standards due to the higher quality factor Q associated with an optical resonance. In order to take advantage of these high quality factors, a coherent interaction between the light and matter is required. One barrier to the widespread deployment of optical frequency standards is the requirement to develop compact, robust, and low-power laser sources amenable to integration at the optical frequency of interest. Additionally, the laser system must offer a means for controlling the systematic errors typically associated with optical frequency standards, including residual amplitude modulation (RAM) and AC-light shifts.

In order to eliminate first-order Doppler effects associated with interrogating a warm atomic vapor, the laser systems typically employ modulation transfer spectroscopy (MTS) or frequency modulation spectroscopy (FMS). However, these approaches often rely on multiple expensive and power hungry optical components such as acousto-optic modulators (AOM) and Electro-optic modulators (EOMs). For example, previously demonstrated MTS techniques start with two distinct optical beams, pump and probe signals, where each of these beams passes through its own AOM. The pump beam AOM creates both a static frequency offset from the probe and imparts a modulation. Often the laser system requires frequency doubling to reach the sample wavelength, which adds complexity to the generation of the pump and probe beams with appropriate characteristics. Each of the beams may pass through a respective second harmonic generation (SHG) module to change the wavelength of the signals. MTS spectroscopy is performed with the two resultant beams. However, providing AOMs and SHG modules in both optical paths adds substantial cost to the system, bulk, and power consumption.

Generation of the two spectroscopy beams with appropriate characteristics for MTS is challenging in a simple laser system due to requirements that the probe beam have no spurious modulation present from the pump light or control electronics. In addition, reliable reduction of RAM in the pump beam is complicated by polarization properties of modulators. Fiber delivery of the beams to the atomic setup is ideal in many cases, however fiber exacerbates potential for undesired modulated light on the probe beam path through etalons, and improper control of RAM through polarization variation over temperature and time in the fibers.

SUMMARY

In one embodiment described herein is a spectroscopy system that includes an optical source configured to generate a first optical signal, a splitter configured to split the first optical signal into a second optical signal and a third optical signal, an acousto-optic modulator (AOM) configured to modulate the second optical signal to output a pump optical signal, a variable optical attenuator (VOA) configured to adjust the power of one of the second optical signal or the third optical signal where the third optical signal is used to generate a probe optical signal, and a vapor cell configured to receive the pump optical signal and the probe optical signal.

Another embodiment herein is a method that includes receiving a first optical signal, splitting the first optical signal into a second optical signal and a third optical signal, generating, using an AOM, a pump optical signal by performing both frequency and amplitude modulation on the second optical signal, generating a probe optical signal using the third optical signal, wherein a VOA adjusts the power of one of the second optical signal or the third optical signal, and transmitting the pump and probe optical signals into a vapor cell to perform spectroscopy.

Another embodiment herein is a spectroscopy system that includes a first optical source configured to generate a first optical signal, a second optical source configured to generate a second optical signal, a first power control signal path configured to adjust the power of the second optical signal to generate a probe optical signal, an AC control signal path configured to frequency modulate the first optical signal and a second power control signal path to control the power of the first optical signal to output a pump optical signal, and a vapor cell configured to receive the pump optical signal and the probe optical signal.

Another embodiment herein is an integrated circuit that includes a digital synthesizer configured to generate a frequency modulated control signal for a pump optical signal where the pump optical signal is used in vapor cell spectroscopy and generate an amplitude modulation signal for compensating for undesired amplitude modulation in the pump optical signal. The integrated circuit also includes a first digital servo configured to, based on an AC component of a probe optical signal, control the wavelength of an optical source that generates at least one of the pump optical signal or the probe optical signal where the probe optical signal is used in vapor cell spectroscopy, a second digital servo configured to, based on an AC component of the pump optical signal, control amplitude modulation parameters in the digital synthesizer, a third digital servo configured to, based on a DC component of the pump optical signal, output a first power control signal to adjust the power of at least one of the pump or probe optical signal, and a fourth digital servo configured to, based on a DC component of the probe optical signal, output a second power control signal to adjust the power of at least one of the pump or probe optical signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 3 is a flowchart for preparing optical signals for performing spectroscopy, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein describe laser systems that provide frequency, amplitude, and power-stabilized light using a single acoustic-optic modulator (AOM) or omit the AOM altogether. The laser system is adaptable to both MTS and FMS spectroscopy schemes. The laser system can include an optical source that includes a frequency doubler (SHG module) which outputs an unmodulated optical signal. This signal can then be split into two optical paths where a first optical path includes an AOM that performs frequency and amplitude modulation to generate a pump optical signal and a second optical path for generating a probe optical signal. These optical signals can then be transmitted to a vapor cell (also referred to as a gas cell) to perform spectroscopy. Advantageously, such a laser system can generate the pump and probe optical signals using only one SHG module and one AOM, thereby reducing costs and space in the laser system relative to previous solutions.

The laser system reduces potential for contamination of the probe optical signal with modulated light, and allows reliable RAM control for the pump optical signal that is insensitive to the input polarization of the modulator. These features enable robust fiber-based laser system configurations. Notably, for embodiments where the optical source requires wavelength adjustment such as frequency doubling, the laser systems described below can use only a single SHG module thereby reducing cost and size.

In addition, the optical source (e.g., an optical amplifier coupled to a laser) can be controlled to perform DC adjustments to the overall optical power, in contrast to other solutions where the AOMs are relied on to control the total power of the optical signals. Moving this responsibility to the optical source means the AOM can perform only AC changes to the pump signal which is beneficial for long term operation. A variable optical attenuator (VOA) can perform additional DC power adjustments on the probe or pump optical signals in order to ensure a proper power ratio between the two optical paths.

In one embodiment, the spectroscopy system includes a control system that performs digital synthesis to generate a control signal for the AOM. The control system (e.g., an application specific integrated circuit (ASIC) or a field programmable gate array (FPGA)) can output a control signal that includes a frequency offset between the pump and probe optical signals, a frequency modulation component for dithering the pump optical signal, and an amplitude modulation component for compensating for undesired amplitude modulation in the pump optical signal. Using digital synthesis (in contrast to using analog circuits), improves signal quality, eliminates undesired intermodulation mixing products, reduces potential crosstalk from modulating multiple devices at the same baseband frequency, and eliminates any analog mixing circuitry.

Figure 1A:
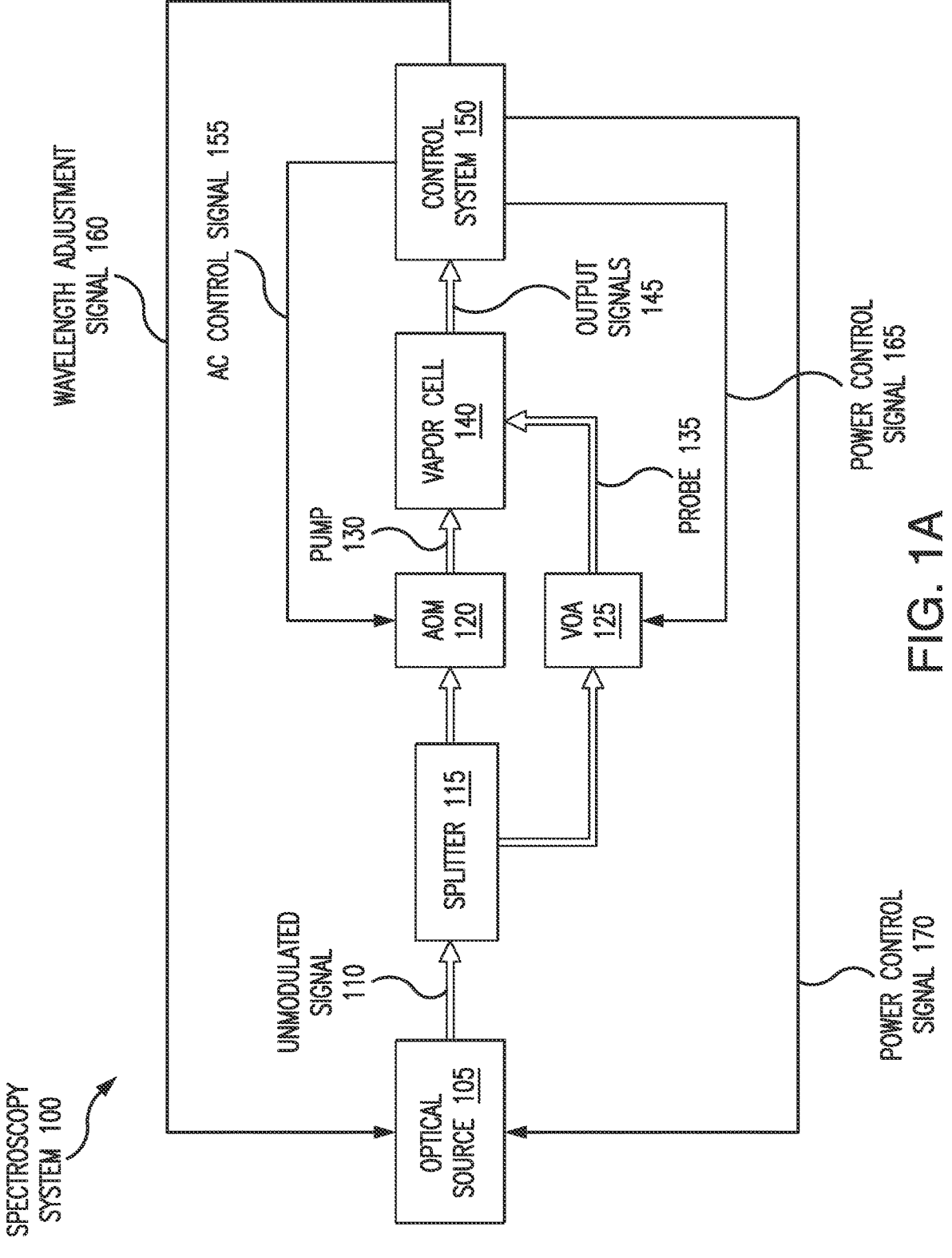
FIGS. 1A-1C illustrate spectroscopy systems, according to one embodiment.

FIG. 1A illustrates a spectroscopy system 100, according to one embodiment. The system 100 includes an optical source 105 that generates an unmodulated optical signal 110. For example, the optical source 105 can be a single laser or a laser system. For example, the optical source 105 can represent a system of components, which is described in FIG. 4A below. In one embodiment, the optical source 105 includes a frequency converter such as a SHG module (also referred to as a frequency doubler) which adjusts the wavelength of the optical signal generated by the source 105. For example, a laser in the optical source 105 may generate an optical signal with a wavelength of 1064 nm which is then frequency doubled with a SHG module to generate a 532 nm unmodulated optical signal 110. However, if the optical source 105 generates an optical signal at the desired frequency of the spectroscopy system 100, then a frequency converter can be omitted from the optical source 105.

The unmodulated optical signal 110 is received at a splitter 115 that splits the power in the signal 110 between two optical paths. The embodiments herein are not limited to any particular split ratio (e.g., 50/50, 60/40, etc.).

The upper optical path includes an AOM 120 which, in one embodiment, performs both frequency and amplitude modulation on the unmodulated signal 110 to generate a modulated pump optical signal 130. Frequency modulation may be performed to dither the pump optical signal 130 to aid the system 100 with locking the optical source 105 to a resonance frequency. Amplitude modulation may be performed to counteract undesired amplitude modulation (e.g., residual amplitude modulation (RAM)) that occurs in the AOM or the optical path prior to the vapor cell 140. In one example, some frequency modulation (to perform the dither) is desired, but amplitude modulation is not. Thus, the AOM 120 can perform amplitude modulation that is out-of-phase with the amplitude modulation that is imprinted upon the pump optical signal 130 in traversing from the AOM to the vapor cell. Using digital synthesis to perform frequency and amplitude modulation with the AOM 120 is described in more detail in FIG. 5.

In one embodiment, the AOM 120 does not perform DC power adjustments to the pump optical signal 130, which are instead performed by the optical source 105. That is, the AOM 120 may make only AC adjustments to the optical signal 130 by performing frequency and amplitude modulation. This is advantageous since AOMs 120 can typically perform only small DC power adjustments to optical signals but are very efficient at performing AC adjustments. Thus, moving responsibility for DC power adjustments for the total system 100 to the optical source 105 can relax the burden on the AOM 120. This enables the AOM 120 to perform both frequency and amplitude modulation where previous solutions included separate electro-optic modulators (EOMs) in the same path as the AOM 120 in order to generate a pump optical signal. That is, in this embodiment, there is no EOM disposed between the AOM 120 and the vapor cell 140.

The lower optical path includes a VOA 125 which adjusts the power of the received unmodulated optical signal 110 to generate a power-controlled probe optical signal 135. Unlike the pump optical signal 130, in this embodiment, the probe optical signal 135 is not frequency modulated. In one embodiment, the VOA 125 performs DC power control on the probe optical signal 135 to set a desired ratio between the power of the optical signals in the upper and lower optical paths. This may be performed to compensate for stability issues with the splitter 115 or delivery optics after the splitter such as optical fiber. In one embodiment, the VOA 125 includes a mirror which is adjusted to control the output power of the probe optical signal 135.

While the Figures illustrate placing the VOA 125 in the path of the probe optical signal 135, in another embodiment the VOA 125 is disposed in the pump signal path 130 to control the DC power of the pump signal while optical source 105 is used to stabilize the power of the probe beam. In that scenario, there would not be any VOA between the splitter 115 and the vapor cell 140.

Advantageously, power control of the probe optical signal 135 can be achieved using the VOA 125 which is less expensive, lower power consuming, and typically a smaller component than an AOM. Thus, the upper and lower optical paths in the system 100 include only one AOM 120 and avoid having a separate EOM to perform frequency modulation on the pump optical signal 130.

The pump and probe optical signals 130, 135 are received at a vapor cell 140. The vapor cell 140 is a container (e.g., a tube) that contains atoms or molecules (e.g., Iodine, Acetylene, or Rubidium vapor, atomic beams, laser cooled atoms) that have a well-defined absorption spectrum. At least a portion of the sides or walls of the vapor cell 140 is transparent so that optical signals can enter and leave the cell 140. Light absorption or fluorescence can be measured while changing the wavelength of the pump optical signal 130 being transmitted through the vapor cell 140 which results in a peak or a series of peaks. At a peak, the pump optical signal 130 is absorbed by the vapor in the cell 140 while at other wavelengths, the optical signal 130 passes through the vapor cell 140 with minimal absorption.

In this embodiment, the vapor cell 140 has two inputs that receive the pump and probe optical signals 130, 135. In one embodiment, the pump and probe optical signals 130, 135 pass through the vapor cell 140 along optical paths that at least partially overlap. That is, at least a portion of the optical paths of the pump optical signal 130 and the probe optical signal 135 in the vapor cell 140 are aligned (e.g., on the same axis). For example, mirrors can be used so that the signals 130 and 135 can enter at different locations along the same side as the vapor cell 140 and still have optical paths that align within the cell 140. In another example, the pump optical signal 130 and the probe optical signal 135 are input into the vapor cell 140 at opposite ends of the vapor cell 140 but along the same axis so their optical paths are aligned. When the wavelengths of these optical signals 130 and 135 are not at a peak of the absorption spectrum of the vapor, little to none of the modulation in the pump optical signal 130 is transferred to the probe optical signal 135. However, when the wavelengths of these optical signals 130 and 135 are near a peak of the absorption spectrum, the modulation is transferred from the pump optical signal 130 to the probe optical signal 135 which is then detected by a control system 150 using optical signal(s) 145 output from the vapor cell 140.

The control system 150 (e.g., hardware (e.g., electronics, ASIC, FPGA, etc.), software, or combinations thereof) can lock the optical source 105 to the wavelength corresponding to a peak in the absorption spectrum of the vapor cell 140 or the fluorescence of the vapor cell 140. The optical source 105 can then be used in precise timing applications such as atomic clocks as well as other applications.

The control system 150 uses the output optical signals 145 to generate a wavelength adjustment signal 160 for adjusting the optical source 105. For example, the control system 150 can sweep the carrier frequency or wavelength of the unmodulated signal 110 until it matches a peak in the absorption spectrum of the vapor in the cell 140. The control system 150 can continue to monitor the output signals 145 to keep the carrier frequency or wavelength of the signal 110 locked to the frequency corresponding to the peak in the absorption or fluorescence spectrum using the wavelength adjustment signal 160. Thus, as environmental conditions change (e.g., change in temperature, humidity, etc.) or as the optical source ages, the spectroscopy system 100 can keep the optical source outputting a signal at the desired wavelength or frequency which matches a peak in the absorption spectrum of the vapor cell 140.

In addition to the wavelength adjustment signal 160, the control system 150 outputs an AC control signal 155 for the AOM 120 to perform the amplitude modulation to counteract inadvertent RAM acquired by the pump beam in moving from the AOM to the vapor cell. Further, in one embodiment, the AC control signal 155 can perform frequency modulation on the pump optical signal. Further, in one embodiment, the AC control signal 155 can control the AOM 120 to set a fixed frequency offset between the pump and probe optical signals 130 and 135 (e.g., 200 MHz).

The control system 150 also outputs a power control signal 165 for adjusting the VOA 125. For example, the control system 150 can use photodiodes to detect when the power in the upper and lower optical paths is not at the desired ratio and adjust the VOA 125 accordingly.

The control system 150 further outputs a power control signal 170 that controls the total power of the optical signals in the system 100. For example, the power control signal 170 may adjust the output power of a laser in the optical source 105, thereby affecting the power of both the pump and probe optical signals 130, 135. Thus, the optical source 105 can control the total DC power of the optical signals in the system 100 while the VOA 125 sets the power ratio between the pump and probe optical signals 130, 135.

Figure 1B:
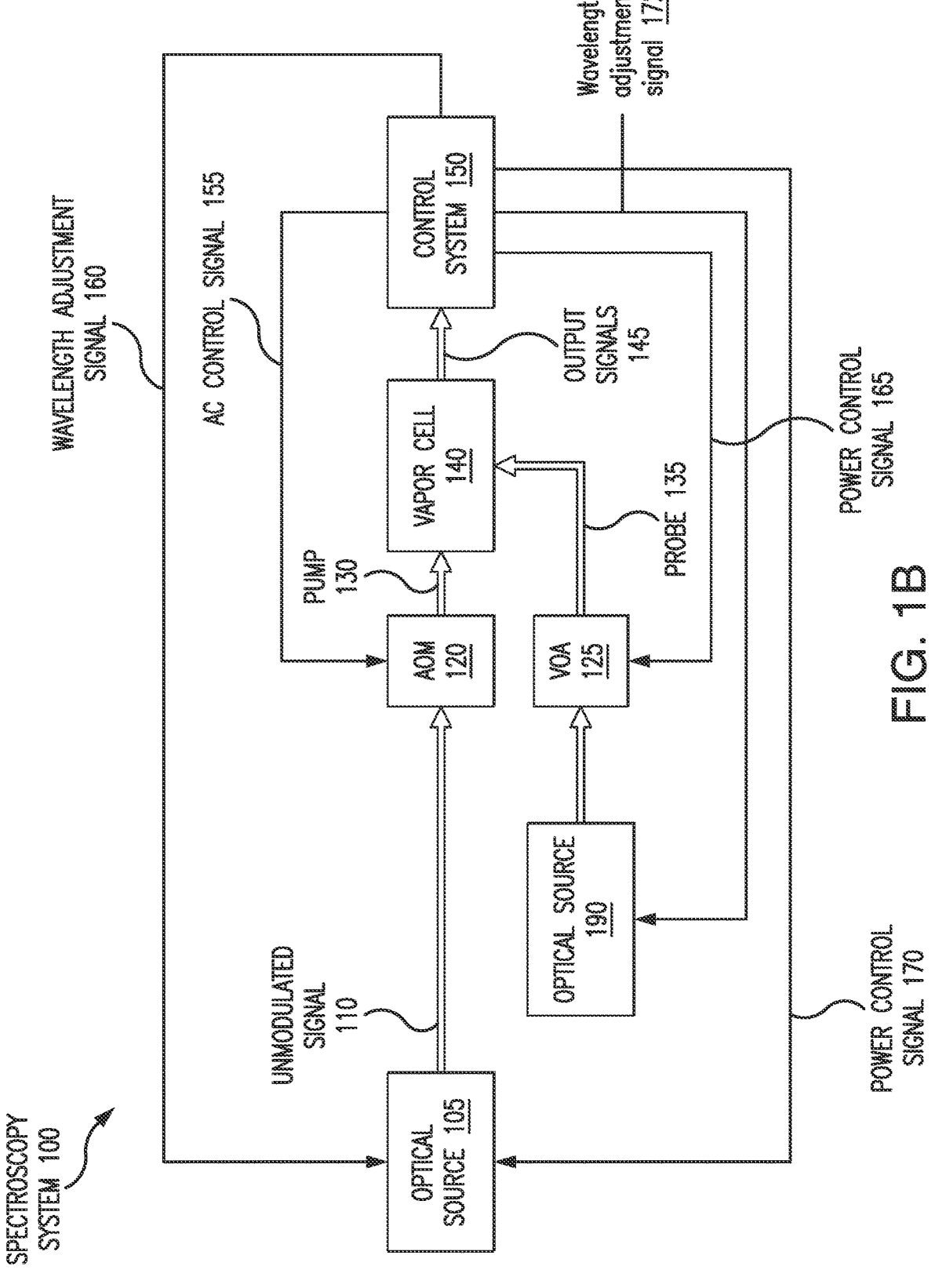

FIG. 1B is similar to FIG. 1A except that two different optical sources are used to generate the pump and probe optical signals 130, 135. That is, the optical source 105 generates the pump optical signal 130 while an optical source 190 outputs an optical signal to the VOA 125 to generate the probe optical signal 135. However, while FIG. 1B illustrates a separate VOA 125, in another embodiment an attenuator is integrated into the optical source 190. That is, the optical source 190 can include a built in amplifier (such as a semiconductor optical amplifier 415 shown in FIG. 4). In this example the optical source 190 is used for power control of the probe, eliminating the need for the VOA.

The optical source 190 can be a single laser or a laser system. For example, the optical source 190 can represent a system of components, which is described in FIGS. 4A and 4B below. In one embodiment, the optical source 190 includes a frequency converter such as a SHG module which adjusts the wavelength of the optical signal generated by the source 190.

Moreover, a separate wavelength adjustment signal 172 is sent to the optical source 190. In one embodiment, the wavelengths of the optical sources 105 and 190 may be synchronized (e.g., at a fixed offset).

Figure 1C:
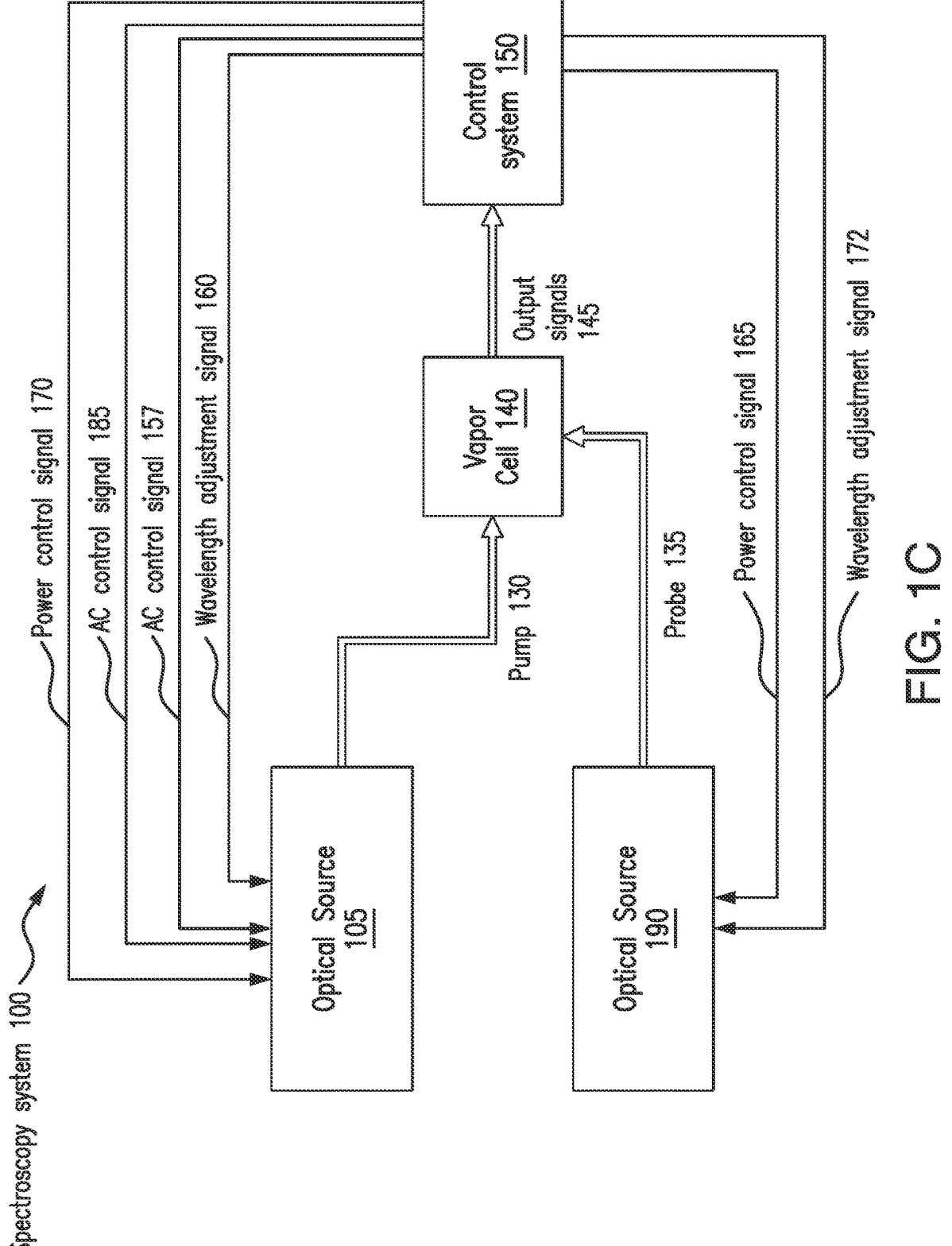

Further, a separate AOM 120 may also not be needed in the system if the optical source 105 includes a built in modulator, which is discussed in FIG. 1C. That is, the laser for the optical source 105 may include a modulator function for generating the pump optical signal 130 directly, without requiring the AOM 120.

FIG. 1C shows an embodiment where two different optical sources are used to generate the pump and probe optical signals 130, 135. That is, the optical source 105 generates the pump optical signal 130 while an optical source 190 outputs a probe optical signal 135. Use of two optical sources 105, 190 enables a laser system with fewer discrete modulators and power control elements which may be advantageous in reducing power, size, and cost. That is, the optical sources 105 and 190 can include a built in amplifier (such as a semiconductor optical amplifier 415 shown in FIG. 4) or other power control function. The pump optical source 105 can include modulation capabilities for frequency or phase modulation control in response to the AC control signal 185 and amplitude modulation in response to the AC control 157 since no light from source 105 is used to generate the probe optical signal 135.

The optical source 190 can be a single laser or a laser system. For example, the optical source 190 can represent a system of components, which is described in FIGS. 4A-4B below. In one embodiment, the optical source 190 includes a frequency converter such as a SHG module which adjusts the wavelength of the optical signal generated by the source 190. In another embodiment the optical source 190 is comprised of a single laser element such as a diode pumped solid state laser (DPSS) which includes intracavity frequency doubling and allows both wavelength and power control. In yet another embodiment the optical source 190 is comprised of a laser operating at the target wavelength (such as a laser diode at 532 nm) and a VOA for power control. In one embodiment, the wavelengths of the optical sources 105 and 190 may be synchronized so they output optical signals at a fixed frequency offset.

In FIG. 1C a separate AOM is not needed in the system because the optical source 105 can include a built in modulator. FIG. 4B shows one embodiment for a source 105 with a built in modulator, which will be discussed below.

Figure 2:
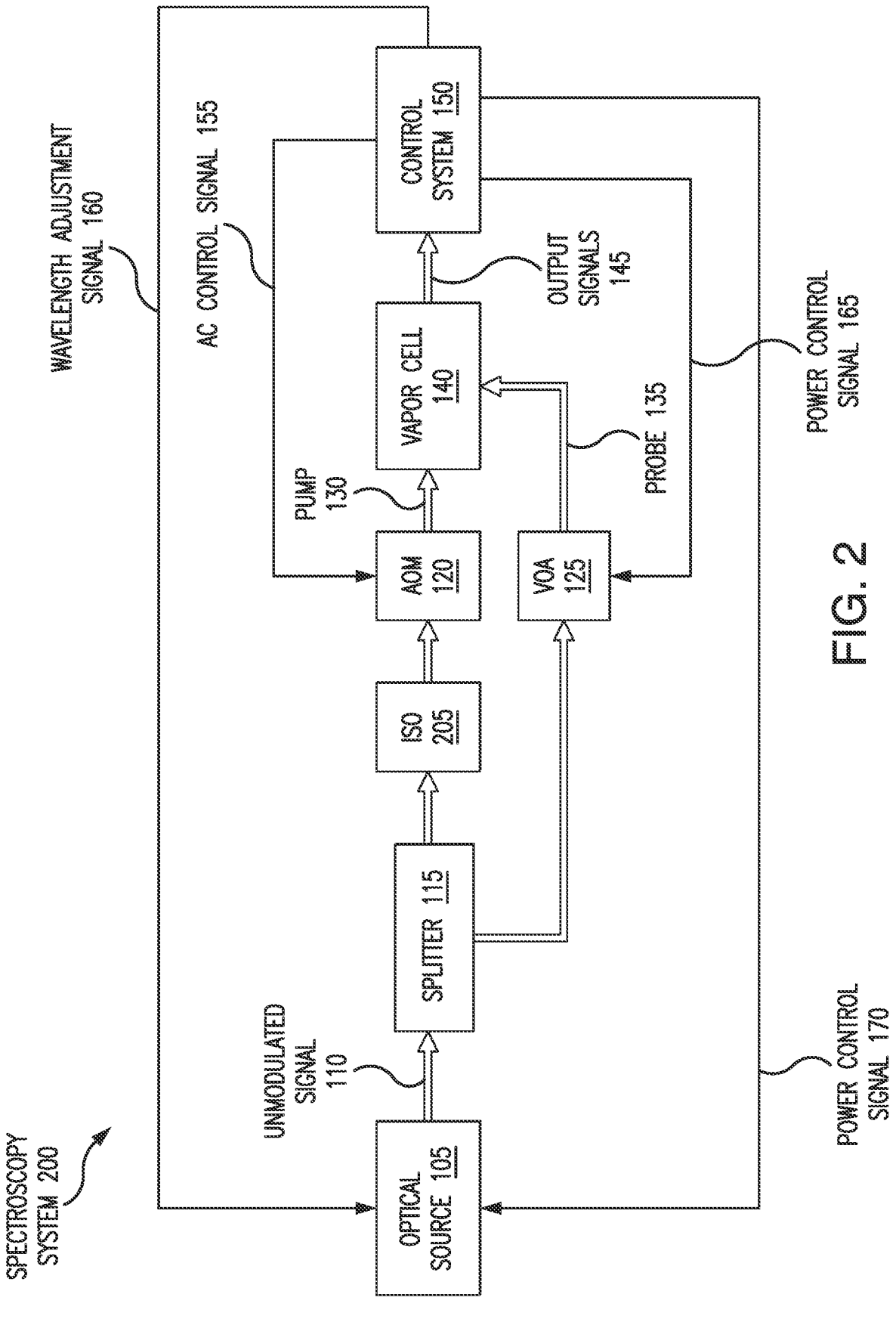
FIG. 2 illustrates a spectroscopy system, according to one embodiment.

FIG. 2 illustrates a spectroscopy system 200, according to one embodiment. The system 200 is the same as the system 100 in FIG. 1A except for the addition of an optical isolator (ISO) 205 between the splitter 115 and the AOM 120. In one embodiment, the ISO 205 prevents backwards reflected light from the AOM 120 and delivery path to the vapor cell from reaching the splitter 115 and the VOA 125. Without the ISO 205, the frequency and/or amplitude modulation performed by the AOM 120 may inadvertently combine with the probe optical signal 135. This parasitic modulation on the probe optical signal 135 is undesired since it can result in the control system 150 misidentifying the modulation on the probe optical signal 135 as being transferred to this signal in the vapor cell 140 at a peak of the absorption spectrum when instead it was inadvertently transferred to the probe optical signal 135 before the signal was transmitted through the vapor cell 140. The ISO 205 can prevent (or mitigate) any parasitic modulation introduced on the pump optical signal 130 from transferring to the probe optical signal 135 before these signals are introduced into the vapor cell 140.

In another embodiment, a third optical signal (e.g., also referred to as a reference optical signal) may be used to compensate for this parasitic modulation. The third optical signal may be an unmodulated reference optical signal (like the probe optical signal 135) that also passes through the vapor cell, but unlike the probe optical signal 135, does not align or overlap with the pump optical signal 130. The third optical signal may be generated from the same optical signal as the probe optical signal 135 using a splitter. Thus, any parasitic modulation on the probe optical signal 135 due to the AOM 120 will also appear on the third optical signal.

Figure 5:
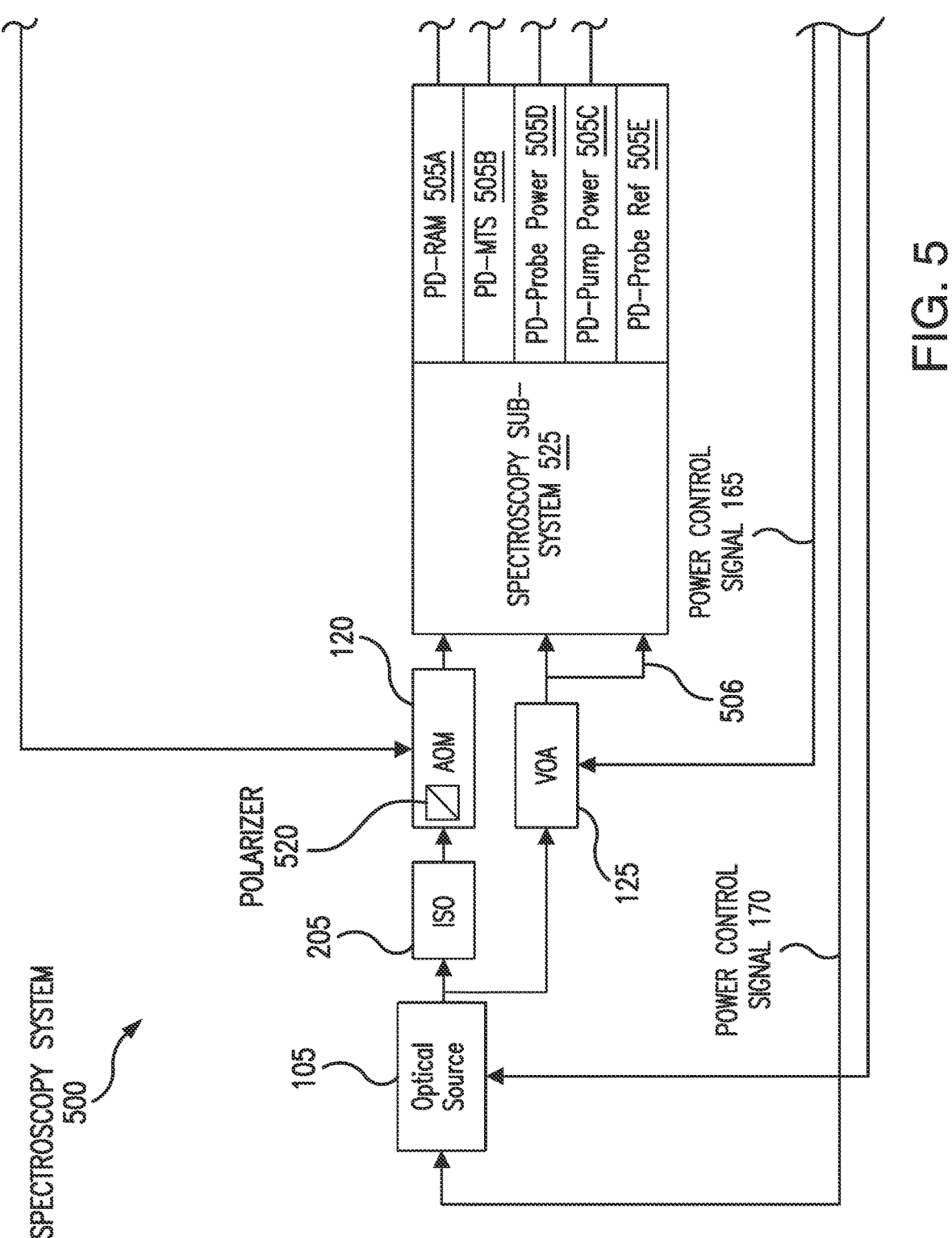
FIG. 5 illustrates a spectroscopy system, according to one embodiment.
Figure 5:
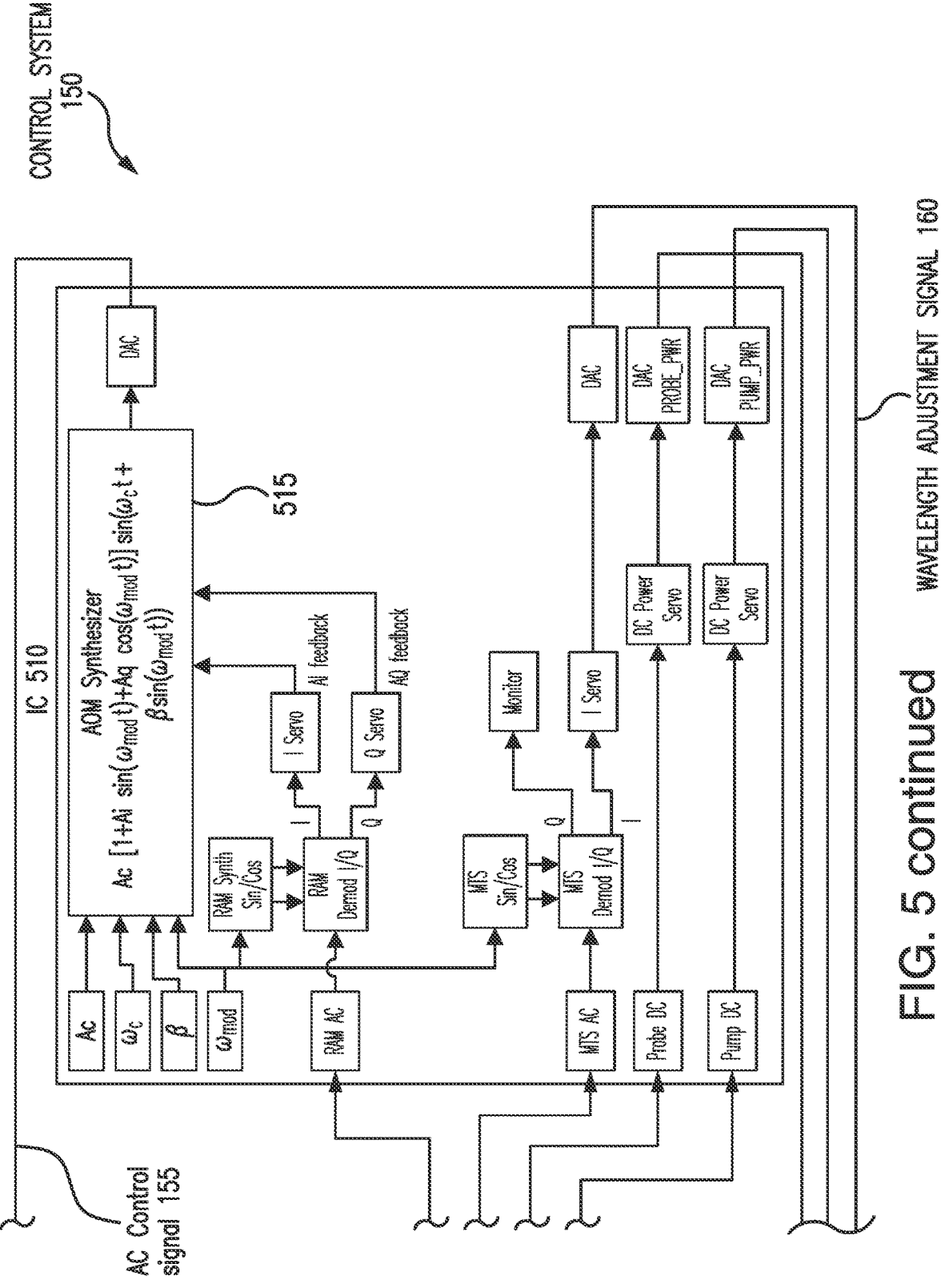

The control system 150 can then use the third optical signal to subtract the parasitic modulation from the probe optical signal 135. The third optical signal could be used in conjunction with the ISO 205 to improve the ability of the system to remove the parasitic modulation (or more generally, for noise mitigation), or could be used in the embodiments in FIGS. 1A and 1B where there is no ISO 205. FIG. 5 shows an embodiment of the third optical signal 506 generated after the VOA 125 and is transmitted through the vapor cell before it is detected by Photodiode 505E.

In any case, the spectroscopy systems 100 and 200 in FIGS. 1 and 2 can be applied to MTS or derivative-based FMS spectroscopy.

FIG. 3 is a flowchart of a method 300 for preparing optical signals for performing spectroscopy, according to one embodiment. The method 300 can be used to perform MTS or derivative-based FMS spectroscopy, but is not limited to such.

At block 305, the spectroscopy system receives an optical signal. In one embodiment, the optical signal is an unmodulated optical signal (e.g., the unmodulated optical signal 110 in FIGS. 1 and 2). The optical signal may have been generated using a laser source and a frequency converter (e.g., a SHG module) that changes the wavelength and the frequency of the laser to match an absorption spectrum of a vapor cell. For example, the laser source may output an optical signal that has a wavelength of 1064 nm which is then reduced by a SHG module to generate a 532 nm optical signal which is in the range of a particular material in the vapor cell. In another example, the laser source may output an optical signal that has a wavelength of 1560 nm which is then reduced by a SHG module to generate a 780 nm optical signal which is in the range of a particular material in the vapor cell. Of course, in other embodiments, the laser source may output an optical signal that is already within the range of the vapor cell (e.g., 532 nm, 780 nm, or 1542 nm) in which case the SHG module can be omitted.

The embodiments herein can include a frequency converter that performs any change in the wavelength generated by the laser source. For example, instead of using a SHG module, a frequency converter that reduces the wavelength by a third, or fourth can be used. Stated differently, the frequency converter can change the wavelength of the optical signal generated by the source such that it is an integer multiple of the wavelength of the optical signal output by the frequency converter.

At block 310, the spectroscopy system splits the optical signal into two optical paths. A splitter can use any desired ratio to split the power in the received optical signal between the two optical paths—e.g., 50/50, 60/40, etc.

At block 315, the spectroscopy system generates a pump optical signal by performing frequency and amplitude modulation on a first portion of the optical signal using an AOM. Stated differently, an AOM is disposed in one of the two optical paths. This AOM can perform both frequency and amplitude modulation in parallel to generate the pump optical signal. The AOM also provides a frequency offset between the pump and probe optical signals. As discussed above, the frequency modulation can add a preset dither to the pump optical signal which can aid in identifying a peak of the absorption spectrum. That is, in addition to sweeping (or tuning) a frequency of the optical signal using the laser source, the AOM can introduce the frequency modulation to perform dithering in a set frequency range.

Amplitude modulation can be used to remove undesired amplitude modulation that is acquired by the pump beam. As is discussed in more detail below, the amplitude can be opposite in phase with the amplitude modulation already on the optical signal to remove the undesired modulation.

At block 320, the spectroscopy system generates a probe optical signal by adjusting the power of a second portion of the optical signal in a different optical path. In one embodiment, this optical path includes a VOA that adjusts the power of the probe optical signal to achieve a desired power ratio between the probe and pump optical signals in the two optical paths. However, in other embodiments, the VOA may be disposed in the optical path of the pump optical signal.

At block 325, the spectroscopy system transmits the pump and probe optical signals to a vapor cell to perform spectroscopy. For example, the vapor cell may include Iodine, Acetylene, or Rubidium.

One or more optical signals exiting the vapor cell can be detected and used to generate synchronization signals to lock the laser source to a particular frequency. This locked signal can then be used in high precision applications such as atomic sensors or clocks.

Figure 4A:
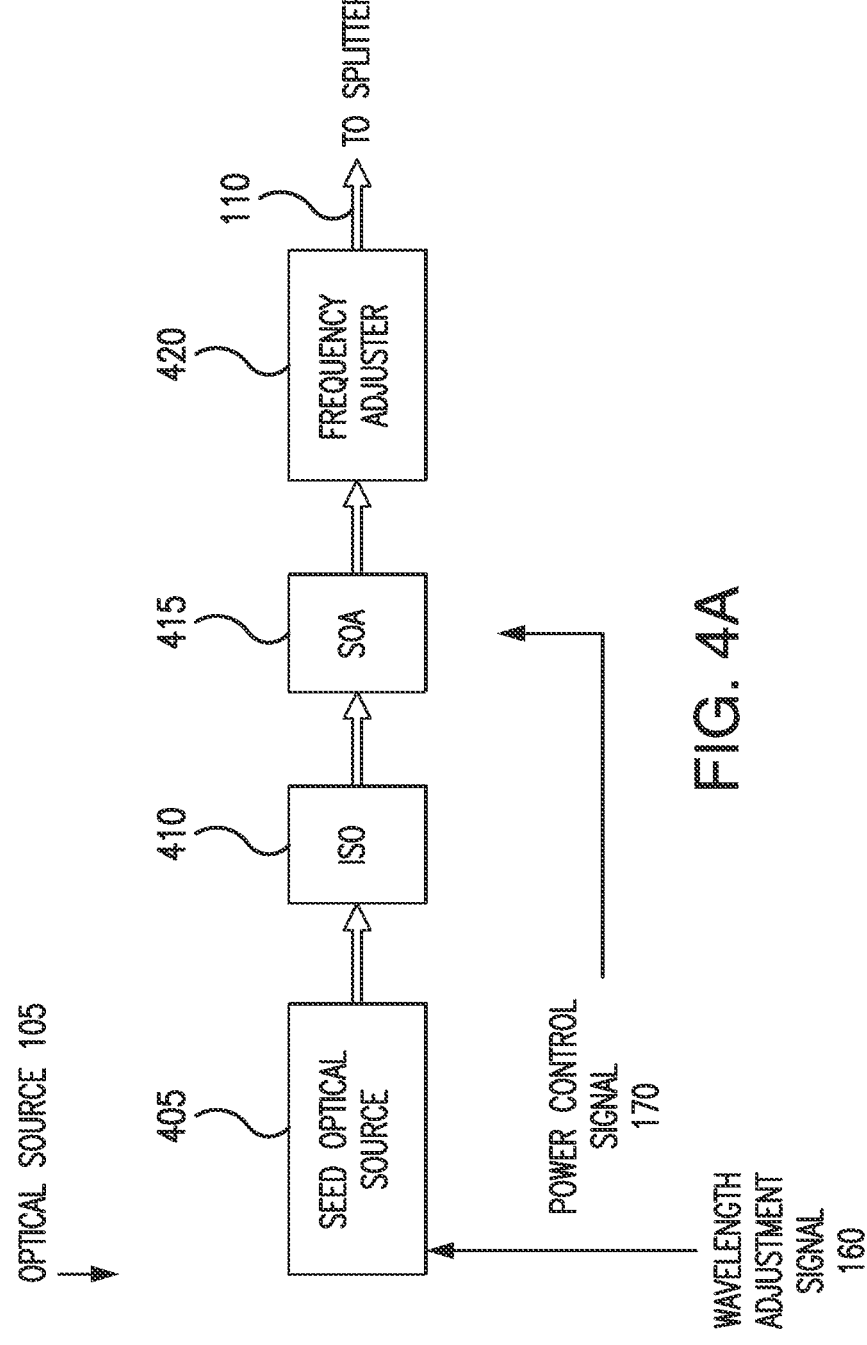
FIGS. 4A and 4B illustrate laser systems for performing spectroscopy, according to one embodiment.
Figure 4B:
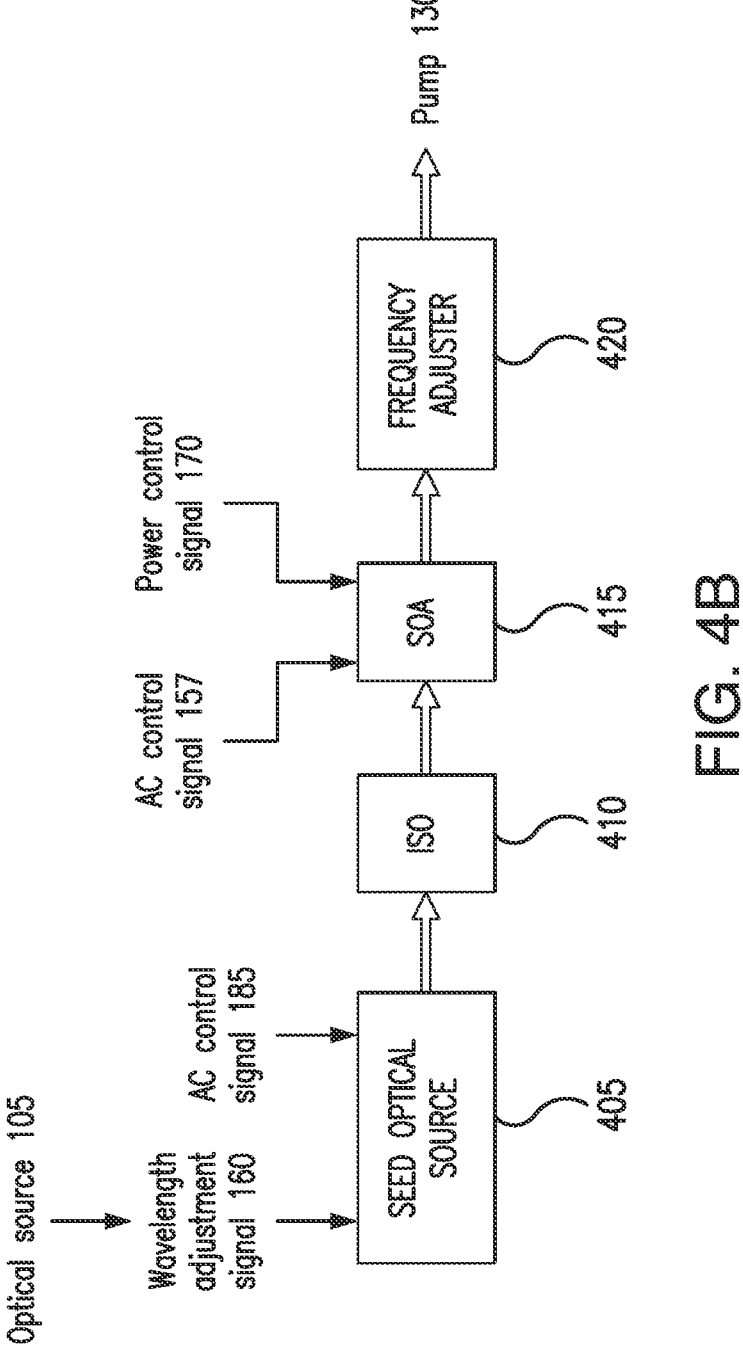

FIG. 4A illustrates an optical source 105 for performing spectroscopy, according to one embodiment. That is, FIG. 4A illustrates various components that may be in the optical source 105 that generate the unmodulated optical signal 110, whether in the single source embodiment shown in FIG. 1A or the two source embodiments shown in FIGS. 1B and 1C. The source 105 includes a seed optical source 405 (e.g., a laser) that outputs an optical signal with a first wavelength. In one embodiment, the seed optical source 405 is a low power semiconductor seed laser. In one embodiment, the seed optical source 405 is a fiber laser. In one embodiment, the seed optical source 405 is a master oscillator power amplifier (MOPA) laser.

The source 105 also includes an optical isolator 410 which prevents back reflections from reaching the seed optical source 405. Further, a semiconductor optical amplifier (SOA) 415 amplifies the optical signal generated by the seed optical source 405. However, other types of optical amplifiers can be used, such as a fiber amplifier but these amplifiers may not provide the same power and modulation benefits as the SOA 415 and may have increased size.

A frequency converter 420 adjusts the wavelength (and the frequency) of the optical signal generated by the seed optical source 405 to a different wavelength that is suitable for spectroscopy. For example, the optical transitions at 532 nm and 514.7 nm have been well studied due to their narrow linewidths and the fact that these wavelengths are accessible by SHG of neodymium- and ytterbium (or erbium)-based lasers, respectively. In order to eliminate first-order Doppler effects associated with interrogating a warm atomic vapor, the laser systems can employ MTS or FMS.

Advantageously, by adjusting the wavelength/frequency of the optical signal in the optical source 105, this means only one frequency converter 420 is used. In contrast, other spectroscopy implementations may place SHG modules in both the pump and probe optical signal paths (e.g., before these signals enter the vapor cell). However, in this embodiment, the systems in FIGS. 1A and 1B do not have to include SHG modules (or any other type of frequency converter) between the AOM 120 and the vapor cell 140 or between the VOA 125 and the vapor cell 140.

The frequency converter 420 can adjust the wavelength by half, third, etc. depending on the application. Thus, the frequency of the optical signal 110 can be any integer multiple of the frequency of the optical signal generated by the seed optical source 405. For example, a SHG module can be used as the frequency converter 420 to convert a 1064 nm optical signal to a 532 nm optical signal for performing MTS or FMS spectroscopy. Thus, the optical signal 110 has a different wavelength than the optical signal generated by the seed optical source 405.

In another embodiment, the seed optical source 105 is a diode-pumped solid-state (DPSS) laser such as Nd:YV04 or Yb:KGW. In that case, the DPSS laser performs the combined functions of the seed optical source 405, SOA 415, and the frequency converter 420. Thus, in one embodiment, the four separate optical components in FIG. 4A can be replaced by a single optical component that generates the unmodulated optical signal 110.

FIG. 4B illustrates an optical source 105 for performing spectroscopy, according to one embodiment. In one embodiment, FIG. 4B is used in the embodiments shown in FIG. 1C where the pump and probe optical signals are generated using two different optical sources 105, 190.

The seed optical source 405 can perform wavelength adjustment and frequency modulation in response to the wavelength adjustment signal 160 and the AC control signal 185.

The SOA 415 performs power control in response to the power control signal 170. In addition, the SOA 415 can also be used for mitigation of RAM in the pump signal by using the AC control signal 157 to perform amplitude modulation of the SOA current to suppress undesired amplitude modulation in the seed laser generated by the source 405 or other elements of the laser system. Thus, in this example, the AC control signal 185 performs frequency modulation at the seed optical source 405 while the AC control signal 157 performs amplitude modulation at the SOA 415. Doing so permits the AOM to be omitted from the system as shown in FIG. 1C since the SOA 415 can perform amplitude modulation. Moreover, the VOA can be omitted from the system as shown in FIG. 1C.

The isolator 410 and the frequency adjuster 420 can function the same as in FIG. 4A.

In another embodiment an EOM could be used in the optical source 105 to provide frequency or phase modulation needed for the pump beam 130.

FIG. 5 illustrates a spectroscopy system 500, according to one embodiment. The spectroscopy system 500 includes the optical source 105, ISO 205, AOM 120, VOA 125, and a spectroscopy sub-system 525 that can include, for example, a vapor cell. These components were described above and will not be described in detail here. The spectroscopy sub-system 525 includes various photodetectors (PDs) 505 for detecting optical signals at intermediate points in the system 500 as well as optical signals exiting the vapor cell. The electrical signals generated by the PDs 505 are then provided to an IC 510 (e.g., an ASIC or FPGA) that is part of the control system 150. The IC 510 then outputs the control signals 155, 160, 165, and 170 introduced in FIGS. 1A and 1B. That is, the IC 510 illustrates logic (e.g., hardware circuitry) for generating these signals using the outputs of the PDs 505.

In this embodiment, the PD 505A and the AOM synthesizer 515 are used to generate an amplitude modulation signal (e.g., AC control signal 155) for compensating RAM or any other undesired amplitude modulation in the pump optical signal generated by the AOM 120. For example, the optical path including the AOM 120 may split a small portion of the pump optical signal to the PD 505A before the pump optical signal passes through the vapor cell. The splitting can be insensitive to the polarization of the pump optical signal to eliminate polarization dependent variations in the optics or fiber used for delivery. The electrical output of the PD 505A (e.g., an AC component of the pump optical signal) can then be used by the IC 510 as part of the AC control signal 155 to mitigate or remove the undesired amplitude modulation on the pump optical signal.

To do so, the output of the PD 505A is connected to a RAM AC circuit (e.g., an analog to digital converter (ADC)). The output of the RAM AC circuit is connected to a RAM I/O demodulator (demod) and I and Q Servos. The outputs of these servos generate Ai and Aq feedback signals which are used as inputs to an AOM synthesizer 515 (e.g., a digital synthesizer) that generates the AC control signal 155.

In addition to mitigating undesired amplitude modulation, the AC control signal 155 can also generate a frequency offset (e.g., 200 MHz) between the pump optical signal and the probe optical signal. Thus, in this embodiment, the AOM synthesizer 515 can use the equation shown in FIG. 5 to generate the signal 155 which performs three tasks: mitigates amplitude modulation in the pump optical signal, performs frequency modulation on the pump optical signal, and establishes a frequency offset of the pump beam with respect to the probe beam. In another embodiment, (e.g., for the embodiments shown in FIGS. 4B and 1C) two AC control signals can be generated to separately output the AC control signal 185 and the AC control signal 157.

In addition to receiving inputs derived from the PD 505A, the AOM synthesizer 515 also receives the parameter inputs for Ac, $\omega_C$, $\beta$, and $\omega_{Mod}$ which provide the AOM synthesizer 515 with data for performing frequency modulation and establishing the frequency offset. Thus, FIG. 5 illustrates an embodiment of a control system 150 for the pump optical signal that uses digital synthesis in contrast to analog circuits which can improve signal quality, eliminate intermodulation mixing products, reduce potential crosstalk from modulating multiple devices at the same baseband frequency, and eliminate any analog mixing circuitry. For example, by using a digital AOM synthesizer 515, this synthesis process does not rely on analog mixers which can add undesired tones into the signal. However, the circuitry shown in IC 510 is just one suitable implementation of a digital synthesis technique for controlling the AOM 120. In another embodiment square wave modulation can be used for frequency and amplitude modulation.

The PD 505B generates a MTS signal for performing MTS spectroscopy. For example, the PD 505B may detect the probe optical signal after passing through the vapor cell. The electrical output of the PD 505B (e.g., an AC component of the probe optical signal) is received by a MTS AC circuit (e.g., an ADC) in the IC 510. The IC 510 includes digital circuitry (e.g., MTS demod I/O, Q Monitor circuit, I servo, and DACs for generating the wavelength adjustment signal 160 which adjusts the wavelength of the optical signal generated by the optical source 105. While FIG. 5 illustrates performing MTS spectroscopy, as discussed above, the left half of the spectroscopy system 500 (i.e., the optical source 105, ISO 205, AOM 120, and VOA 125) can also be used to perform other types of spectroscopy, such as FMS. In that case, the digital circuitry in the IC 510 may be different.

The PD 505C generates a pump power signal that adjusts the total power of the optical signals in the system 500. For example, a splitter can be used to divert a small portion of the pump optical signal to the PD 505C before the pump optical signal passes through the vapor cell 140. The electrical output of the PD 505C (e.g., a DC component of the pump optical signal) is received at a pump DC circuit in the IC 510 which includes a DC power servo and a Pump_Pwr DAC for outputting the power control signal 170 to the optical source 105.

The PD 505D generates a probe power signal that adjusts the power of the probe optical signal. For example, a splitter can be used to divert a small portion of the probe optical signal to the PD 505D before the probe optical signal passes through the vapor cell 140. Another implementation places PD 505D after the vapor cell 140 where the probe optical signal may be detected. The electrical output of the PD 505D (e.g., a DC component of the probe optical signal) is received at a probe DC circuit in the IC 510 which includes a DC power servo and a Probe_Pwr DAC for outputting the power control signal 165 to the VOA 125. As discussed above, the power control signal 165 can adjust the VOA 125 to set a desired power ratio between the pump and probe optical signals.

The implementation of the power servos can differ according to the location of the VOA (e.g., in the pump or probe optical paths) or whether an optical source has a built in attenuator. For example, if the VOA is built into the optical source (e.g., the SOA 415 in FIG. 4), the power control signal 165 can be fed to the optical source directly.

The PD 505E generates a probe reference signal for balanced detection with the MTS signal generated by the PD 505B. For example, the PD 505E may be used when the optical source 105 has significant residual intensity noise (RIN), like DPSS lasers. Additionally PD 505E may be used when optical source 105 has significant frequency noise. PD 505E can also mitigate the impact of undesired leakage of modulate pump light onto the probe signal. However PD 505E may be omitted from the system. In one embodiment, PD 505E is a fiber coupled photodiode receiving optical signal 506. In another embodiment, optical signal 506 is generated with free space optics inside the spectroscopy subsystem prior to measurement with PD 505E.

In one embodiment, the optical components in the system 500 (e.g., the optical source 105, ISO 205, AOM 120, and VOA 125) are fiber coupled.

In one embodiment, the AOM 120 also includes a polarizer 520 that mitigates or eliminates differential RAM in possible orthogonal light polarizations. The polarizer 520 can be arranged at the input of the AOM 120 or at the output of the AOM 120.

While FIG. 5 illustrates using four PDs (i.e., PDs 505A-D) to detect AC and DC components of the pump and probe optical signals before or after these signals pass through the vapor cell in the spectroscopy subsystem 525, in another embodiment, the system 500 may have only two PDs that respectively detect the pump and probe optical signals. These two electrical signals can then be processed in the IC 510 and separated into their AC and DC components. For example, after the IC 510 separates the electrical signal generated from the pump optical signal into an AC component and a DC component, the AC component can be transmitted to the RAM AC and the DC component can be transmitted to the Pump DC. After the IC 510 separates the electrical signal generated from the probe optical signal into an AC component and a DC component, the AC component can be transmitted to the MTS AC and the DC component can be transmitted to the Probe DC.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A spectroscopy system, comprising:
an optical source configured to generate a first optical signal;
a splitter configured to split the first optical signal into a second optical signal and a third optical signal;
an acousto-optic modulator (AOM) configured to modulate the second optical signal to output a pump optical signal;
a variable optical attenuator (VOA) configured to adjust the power of one of the second optical signal or the third optical signal, wherein the third optical signal is used to generate a probe optical signal;
a vapor cell configured to receive the pump optical signal and the probe optical signal; and
an optical isolator disposed between the splitter and the AOM configured to prevent back reflections from the AOM from reaching the splitter.

2. The spectroscopy system of claim 1, wherein the AOM is configured to perform a frequency modulation to dither the pump optical signal.

3. The spectroscopy system of claim 2, wherein the AOM is configured to perform an amplitude modulation on the pump optical signal in parallel with performing the frequency modulation, wherein the amplitude modulation mitigates or removes an undesired amplitude modulation caused by residual amplitude modulation (RAM).

4. The spectroscopy system of claim 1, further comprising:
a splitter configured to split the probe optical signal to output a reference optical signal that passes through the vapor cell but does not overlap with the pump optical signal in the vapor cell, wherein the reference optical signal is used for noise mitigation.

5. The spectroscopy system of claim 1, wherein the AOM includes a polarizer configured to mitigate differential RAM in the pump optical signal.

6. The spectroscopy system of claim 1, wherein the optical source comprises:
a seed optical source configured to generate a seed optical signal;
a semiconductor optical amplifier (SOA) or a fiber amplifier configured to receive the seed optical signal and output an amplified optical signal; and
a frequency converter configured to change a wavelength of the amplified optical signal to generate the first optical signal.

7. The spectroscopy system of claim 6, wherein a wavelength of the seed optical signal is an integer multiple of a wavelength of the first optical signal.

8. The spectroscopy system of claim 6, further comprising:
a control system configured to generate:
a wavelength adjustment signal for the seed optical source to change the wavelength of the seed optical signal based on receiving an output optical signal from the vapor cell,
a power control signal for the SOA or the fiber amplifier to control an output power of the pump optical signal,
an alternating current (AC) control signal for the AOM to modulate the pump optical signal, and
a power signal to the VOA for attenuating the power of one of the second optical signal or the third optical signal.

9. The spectroscopy system of claim 1, wherein there are no frequency converters disposed between the AOM and the vapor cell or between the VOA and the vapor cell.

10. The spectroscopy system of claim 1, wherein there is no electro-optic modulator disposed between the AOM and the vapor cell.

11. A method, comprising:
receiving a first optical signal;
splitting the first optical signal into a second optical signal and a third optical signal;
generating, using an AOM, a pump optical signal by performing both frequency and amplitude modulation on the second optical signal;
transmitting the second optical signal through an optical isolator before reaching the AOM, wherein the optical isolator prevents back reflections from the AOM from passing therethrough;
generating a probe optical signal using the third optical signal, wherein a VOA adjusts the power of one of the second optical signal or the third optical signal; and
transmitting the pump and probe optical signals into a vapor cell to perform spectroscopy.

12. The method of claim 11, further comprising:
transmitting a power control signal to an optical source generating the first optical signal, wherein the power control signal adjusts the power of both the pump optical signal and the probe optical signal.

13. The method of claim 11, wherein providing the first optical signal comprises:
generating a seed optical signal;
amplifying the seed optical signal using a SOA; and
adjusting a wavelength of the seed optical signal.

14. The method of claim 13, wherein a wavelength of the seed optical signal is an integer multiple of a wavelength of the first optical signal.

15. The method of claim 13, further comprising:
receiving an output optical signal from the vapor cell at a photodiode to generate a spectroscopy signal; and generating, based on the spectroscopy signal, a wavelength adjustment signal to change a wavelength of the seed optical signal.

16. A modulation transfer spectroscopy (MTS) system, comprising:

a first optical source configured to generate a first optical signal;

a second optical source configured to generate a second optical signal;

a first power control signal path configured to adjust the power of the second optical signal to generate a probe optical signal;

an AC control signal path configured to frequency modulate the first optical signal and a second power control signal path to control the power of the first optical signal to output a pump optical signal; and a vapor cell configured to receive the pump optical signal and the probe optical signal, wherein the spectroscopy system does not include an AOM.

17. The MTS system of claim 16, wherein the first optical source comprises a semiconductor optical amplifier (SOA) configured to receive an AC amplitude control signal that modulates the SOA to perform amplitude modulation on the first optical signal.

18. The MTS system of claim 17, wherein the first optical source comprises a seed optical source configured to receive an AC control signal to frequency modulate the first optical signal.

19. The MTS system of claim 16, further comprising:

a VOA that is separate from the second optical source and receives a first power control signal, wherein the VOA is configured to output the probe optical signal.

* * * * *